United States Patent [19]

Lu et al.

[11] Patent Number: 5,758,047
[45] Date of Patent: May 26, 1998

[54] METHOD OF PROCESS CONTROLLER OPTIMIZATION IN A MULTIVARIABLE PREDICTIVE CONTROLLER

[76] Inventors: Zhuxin Joseph Lu, 19513 N. 73rd La., Glendale, Ariz. 85308; J. Ward Mac Arthur, 5658 E. Sandra Terr., Scottsdale, Ariz. 85254; Brian C. Horn, 4121 E. Cortez St., Phoenix, Ariz. 85028

[21] Appl. No.: 490,499

[22] Filed: Jun. 14, 1995

[51] Int. Cl.$^6$ .................... G06F 15/00; G09B 5/00; G09C 1/00; H01J 31/00
[52] U.S. Cl. .................... 375/148; 364/162
[58] Field of Search .................... 364/148, 149, 364/150, 151, 152, 153, 154, 155, 160–163

[56] References Cited

U.S. PATENT DOCUMENTS

| | | | |
|---|---|---|---|
| 4,349,869 | 9/1982 | Prett et al. | 364/159 |
| 4,916,635 | 4/1990 | Singer et al. | 364/153 X |
| 5,184,292 | 2/1993 | Schneider | 364/162 |
| 5,566,065 | 10/1996 | Hansen et al. | 364/164 |

OTHER PUBLICATIONS

Kossman et al.; "Model Based Control of a Partial Burn Fluid Catalytiac Cracking Unit"; Computing and Control Engineering Journal; Feb. 1995.

*Primary Examiner*—Reba I. Elmore
*Assistant Examiner*—Sheela S. Rao
*Attorney, Agent, or Firm*—Arthur A. Sapelli; Anthony Miologos

[57] ABSTRACT

In a process control system, having a controller for providing robust control of a process, the controller utilizes a predetermined range control procedure the results being a control solution. The process has at least one manipulated variable and at least one controlled variable. A method of providing dynamic optimization comprises the steps of calculating an optimized set of steady state values of the manipulated variables and the controlled variables. An augmented range control procedure is created to harmonize the set of steady state values with the control solution. The augmented range control procedure is solved, the manipulated variables generated thereby being compatible with the set of steady state values and with the control solution. The process is controlled in accordance with the manipulated variables generated by the augmented range control procedure, thereby providing optimal control of the process.

4 Claims, 4 Drawing Sheets

METHOD OF PROCESS CONTROLLER OPTIMIZATION IN A MULTIVARIABLE PREDICTIVE CONTROLLER

BACKGROUND OF THE INVENTION

The present invention relates to control systems, and more particularly, to a method of dynamic process optimization in a robust multivariable predictive controller (RMPC), the RMPC utilizing range control.

In present day control systems, optimization is accomplished by calculating a steady state solution, and then cascading that solution to a multivariable predictive controller (MPC) performing the control problem. There are essentially two shortcomings with this present day approach. Firstly, because of the cascade arrangement of the steady state solution, the speed of the optimization is solely dependent upon the speed of the MPC. Thus if the MPC speed is slow, the speed of performing the steady state optimization cannot be fast. Secondly, the steady state solution is oftentimes not dynamically compatible with the control solution of the MPC.

Thus there is a need to implement the steady state optimization solution in a way that is dynamically compatible with the controller solution. The method of the present invention merges the optimization solution with the control solution which results in an overall compatible control result of a process being controlled.

SUMMARY OF THE INVENTION

Therefore, there is provided by the present invention, a method of dynamic process optimization wherein the optimization solution operates in harmony with the control solution. In a process control system, having a controller for providing robust control of a process, the controller utilizes a predetermined range control procedure the results being a control solution. The process has at least one manipulated variable and at least one controlled variable. A method of providing dynamic optimization comprises the steps of calculating an optimized set of steady state values of the manipulated variables and the controlled variables. An augmented range control procedure is created to harmonize the set of steady state values with the control solution. The augmented range control procedure is solved, the manipulated variables generated thereby being compatible with the set of steady state values and with the control solution. The process is controlled in accordance with the manipulated variables generated by the augmented range control procedure, thereby providing optimal control of the process.

Accordingly, it is an object of the present invention to provide a method of dynamic process optimization.

It is another object of the present invention to provide a method of dynamic process optimization wherein an optimization solution is merged with a control solution.

It is another object of the present invention to provide a method of dynamic process optimization wherein an optimization solution is merged with a control solution.

It is still another object of the present invention to provide a method of dynamic process optimization wherein the optimization solution and the control solution operate in harmony.

These and other objects of the present invention will become apparent when taken in conjunction with the following description and attached drawings, wherein like characters indicate like parts, and which drawings form a part of the present application.

DETAILED DESCRIPTION

Before describing the method of the present invention, it will be helpful in understanding a system environment in which the present invention is utilized.

Figure 1:
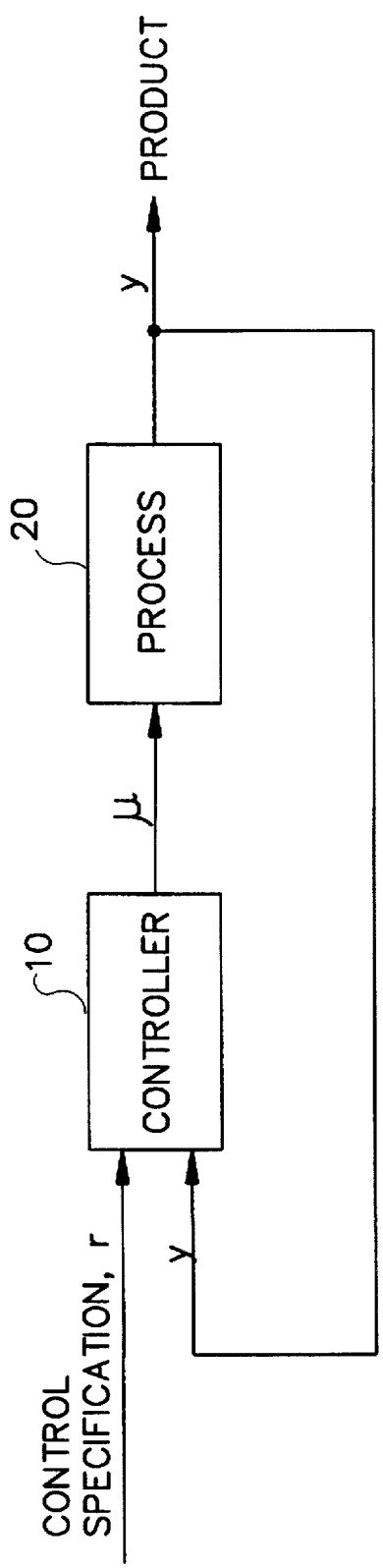
FIG. 1 shows a functional block diagram of a process control system in which the present invention can be utilized.

Referring to FIG. 1, there is shown a functional block diagram of a process control system in which the present invention may be utilized. A controller 10 has multiple outputs, which are coupled as input variables u to a process 20. The process 20 can include, for example, a plurality of elements which can be controlled such as valves, heaters,.. Process variables y of process 20 include temperature, pressure, level, flow, . . . which govern product quality. The input variables (or manipulated variables) u, are defined as:

$$u = \begin{bmatrix} u_1 \\ u_2 \\ \cdot \\ \cdot \\ u_m \end{bmatrix} \text{ or } mv = \begin{bmatrix} mv_1 \\ mv_2 \\ \cdot \\ \cdot \\ mv_m \end{bmatrix}$$

and the output variables (or controlled variables) cv, are defined as:

$$cv = \begin{bmatrix} cv_1 \\ cv_2 \\ \cdot \\ \cdot \\ cv_n \end{bmatrix}$$

Thus, the process 20 is a dynamic process P(s) having m manipulated variables and n controlled variables. The controlled variables (cv) include $n_1$ regulated cv, $n_2$ restrained cv, and $n_3$ optimized cv. Generally, $$n \geq m \geq n_1$$

In the present invention, the control specification, r, (this is referred to as setpoint in previous systems) is defined as follows:

$$r = \begin{bmatrix} r_1 \in [\underline{r}_1, \overline{r}_1] \\ r_2 \in [\underline{r}_2, \overline{r}_2] \\ \cdot \\ \cdot \\ r_n \in [\underline{r}_n, \overline{r}_n] \end{bmatrix}$$

For the regulated $cv_i$, the lower bound is equal to the upper bound, $\underline{r}_i = \overline{r}_i$. For the restrained $cv_j$, the upper bound is greater than the lower bound, $\overline{r}_j \geq \underline{r}_j$, or there is either a lower bound only or there is an upper bound only. Finally, for the optimized cv, there is no bound at all.

The range control function of controller 10 is formulated to handle the three cases identified above in accordance with:

$$\min_{x,y} \|1/2\ W(Ax - y)\|_2$$

Subject to:

$$\underline{MV} \leq x \leq \overline{MV}$$

and $$\underline{PV} \leq y \leq \overline{PV};$$

where, W is a user weighing matrix;

A is a dynamic model matrix ($a_{ij}$ coefficients) that relates the process dynamics of an output to an input; y (optimal response trajectory) are range variables (extension of setpoint); and x (the control solution) is the manipulated variable $\Delta u$ (i.e., $\Delta u = u_{CURRENT} - u_{LAST}$), depending on the application. $\underline{PV}$ and $\overline{PV}$ (process variable) is the range it is desired to have the process operate, and $\underline{MV}$ and $\overline{MV}$ is the range physical limits it is desired to have the process operate.

A more detailed description of the multivariable predictive controller (MPC) can be had by referring to U.S. Pat. No. 5,351,184, issued 27 Sept. 1994, entitled "Method of Multivariable Predictive Control Utilizing Range Control", assigned to the same assignee as the present application and incorporated by reference herein.

Figure 2:
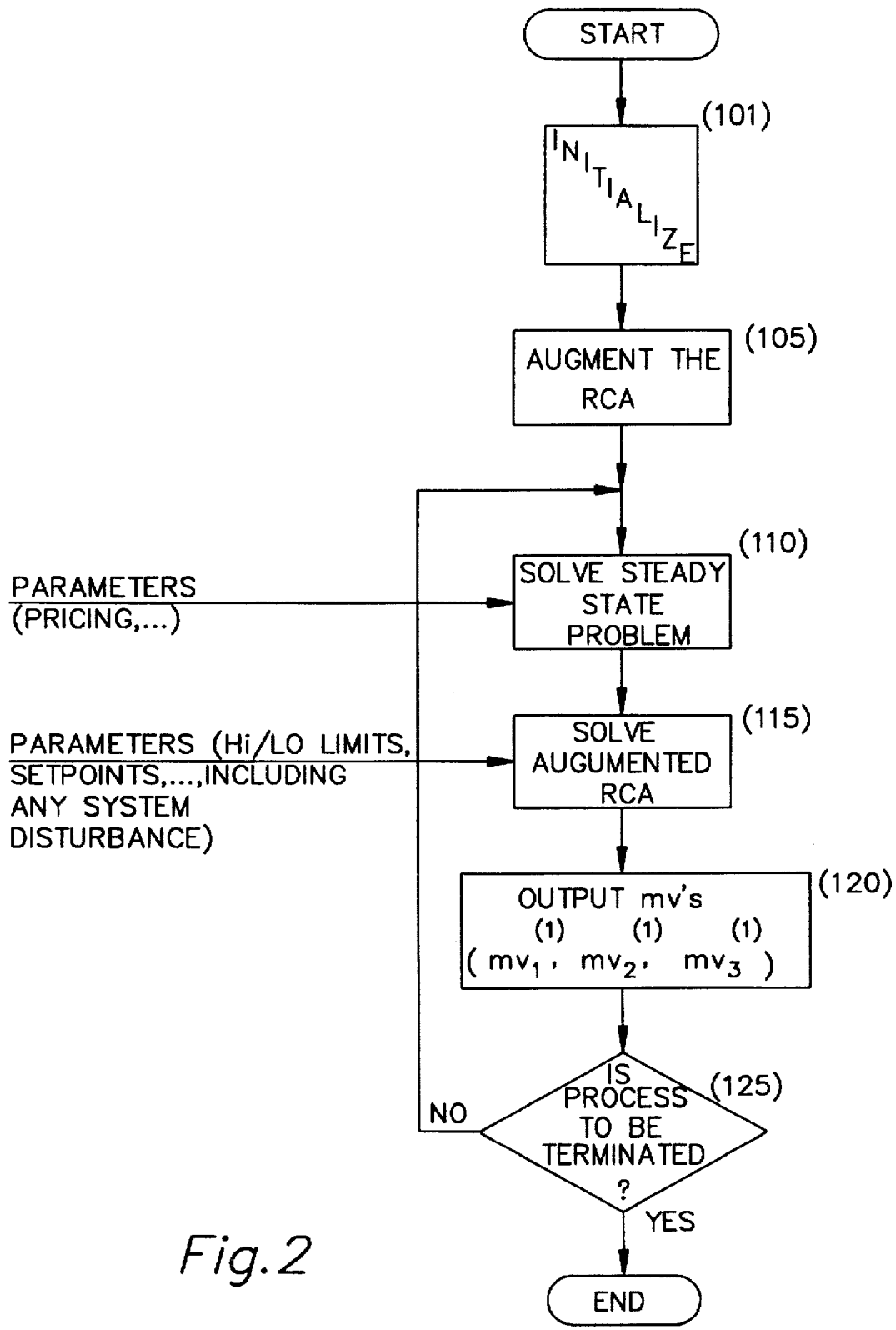
FIG. 2 shows a flow diagram of the method of the present invention.

In the preferred embodiment of the present invention, the optimal solution is merged into the RMPC control solution utilizing range control, and more specifically, merged into a range control procedure, i.e., the Range Control Algorithm (RCA), and resulting in an overall compatible solution and will now be described. Referring to FIG. 2 there is shown a flow diagram of the method of the present invention. When the control process is started, initialization, housekeeping, . . . is performed as required (block 101). The range control algorithm (RCA) is then augmented to incorporate the steady state solution (block 105). The form of the augmented RCA procedure to be described hereinunder. The next step (block 110) solves a steady state optimization problem, i.e., solve:

$$\min_{x_{ss}} \sum_i \$_i^{cost} cv_i + \$_i^{\delta cost}(cv_i - y_i^{sp})^2 + \sum_j \$_j^{cost} mv_j + \$_j^{\delta cost}(mv_j - u_j^{sp})^2$$

This is a quadratic steady state optimization expression, well know to those skilled in the art. The next step (block 115) solves the augmented range control algorithm. The input parameters to the augmented RCA include, setpoint, hi/lo limits, system disturbances,. The augmenting (or merging, and sometimes referred to as harmonizing) of the steady state optimization solution with the dynamic control solution results in an overall compatible solution. The newly calculated $mv_s$ are outputted (block 120) to control the process. If the process is not to be terminated (block 125), the control process repeats at block 110.

The augmentation is accomplished by expanding the A-matrix such that, for example, the augmented A-matrix, i.e., $\mathsf{A}$ matrix, for a 3 mv solution and for five point predictive solution results in:

$$\mathsf{A} = \begin{bmatrix} A \\ 111110000000000 \\ 000001111100000 \\ 000000000011111 \end{bmatrix}$$

In a more general form, the augmented range control algorithm solution has the form:

$$\min_{x,y} 1/2 \| \mathsf{A} x - Y \|_2$$

where $Y = \begin{bmatrix} y \\ X_{ss} \end{bmatrix}$ $$X_{ss} = \begin{bmatrix} X_{ss}^{(1)} \\ X_{ss}^{(2)} \\ X_{ss}^{(3)} \end{bmatrix}$$

or $$\min_{x,y} \frac{1}{2} \left\| \begin{bmatrix} W & \\ & W_o \end{bmatrix} \left( \begin{bmatrix} A & & & & & \\ 1 \cdots 1 & 0 \cdots 0 & 0 \cdots 0 & 0 \\ 0 \cdots 0 & & & & \\ & & 1 \cdots 1 & & \\ & & & 0 \cdots 0 \\ 0 \cdots 0 & 0 \cdots 0 & 0 \cdots 0 & 1 \cdots 1 \end{bmatrix} x - \begin{bmatrix} y \\ X_{ss} \end{bmatrix} \right) \right\|_2$$

$X_{ss}$ is a known value, acting like a setpoint change derived from block 110, $W_0$ is the tuning weight to adjust the optimization speed.

The x matrix indicates the first move (now) of the first mv, i.e., $mv_1$, the second move (e.g., 1 minute later) of $mv_1$, the third move (e.g., 2 minute later) of $mv_1$, ... the fifth move (e.g., 4 minutes later), ; ..., the current move of $mv_2$, the second move (i.e., 1 min later), ..., and finally the fifth move of $mv_3$ (i.e., 4 minutes later).

Thus, $$x = \begin{bmatrix} \Delta mv_1^{(1)} \\ \Delta mv_1^{(2)} \\ \Delta mv_1^{(3)} \\ \cdot \\ \cdot \\ \cdot \\ \Delta mv_1^{(5)} \\ \Delta mv_2^{(1)} \\ \Delta mv_2^{(2)} \\ \cdot \\ \cdot \\ \cdot \\ \Delta mv_3^{(5)} \end{bmatrix}$$

Thus, the first augmented row of the Ą matrix multiplied by x indicates the summation of all the moves of the first mv ($mv_1$) of the 5 points being calculated in this example. Thus, $$= \Delta mv_1^{(1)} + \Delta mv_1^{(2)} + \Delta mv_1^{(3)} + \Delta mv_1^{(4)} + \Delta mv_1^{(5)}$$

The augmented range control algorithm:

$$\min_{x,y} 1/2 \left\| \begin{bmatrix} A \\ 111110000000000 \\ 000001111100000 \\ 000000000011111 \end{bmatrix} x - \begin{bmatrix} y \\ X_{ss}^{(1)} \\ X_{ss}^{(2)} \\ X_{ss}^{(3)} \end{bmatrix} \right\|_2$$

equates to:

$$\min_{x,y} 1/2 \| Ą x - Y \|_2$$

which has a similar form as the range control algorithm, making the implementation of the merging of the steady state optimization solution with the dynamic control matrix relatively straight forward. (There is no cascading in the present invention.)

Thus, the present invention specifies the values of the mvs, i.e., indicates where the points need to be, without indicating how the mvs are to get to the steady state point. How the points (i.e., the individual values of the $mv_s$) arrive at the steady state point is a function of the controller and the control solution.

The path each mv has to take from the current point to the final optimal point is not specified by the results of the optimization but is resolved by the solution of the present invention, thereby guaranteeing the compatibility of the optimized solution and the control solution. The weighting matrix W and $W_O$ is selected such that neither the control solution nor the optimization solution is predominant in the merged case.

As an example, there is shown an RMPC application for a Residue Fluidized Catalytic Cracking Unit, RFCCV having 20 cvs and 7 mvs, as indicated in Tables 1 an 2. $Cv_1$ is regulated and the rest of the cv's have high/low bounds.

Figure 3:
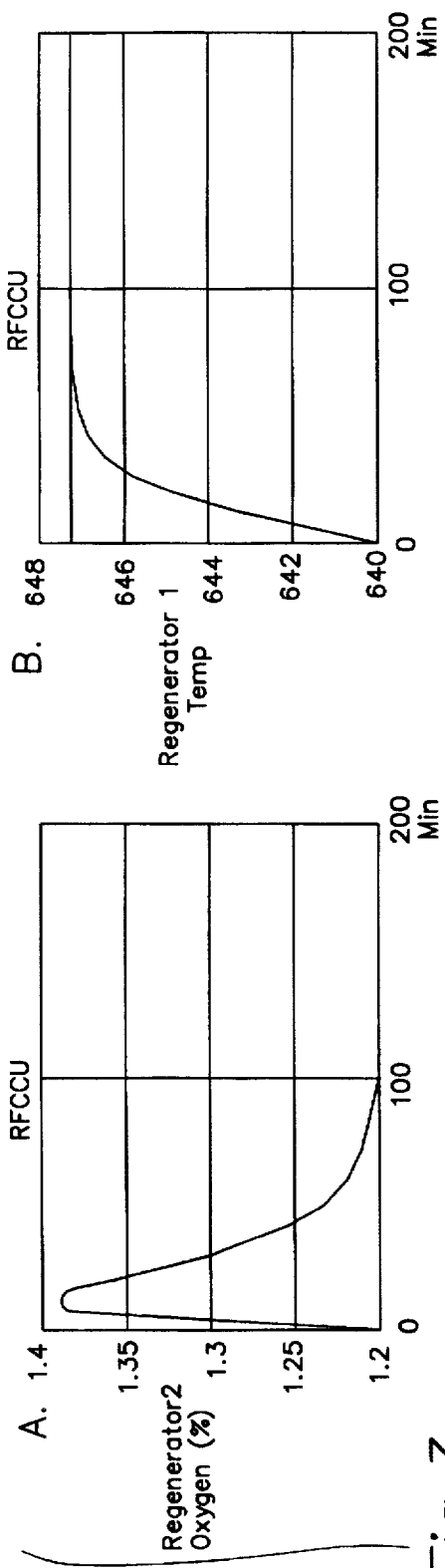
FIG. 3 shows the graphs of controlled variables 1–4 of an example problem.
Figure 3:
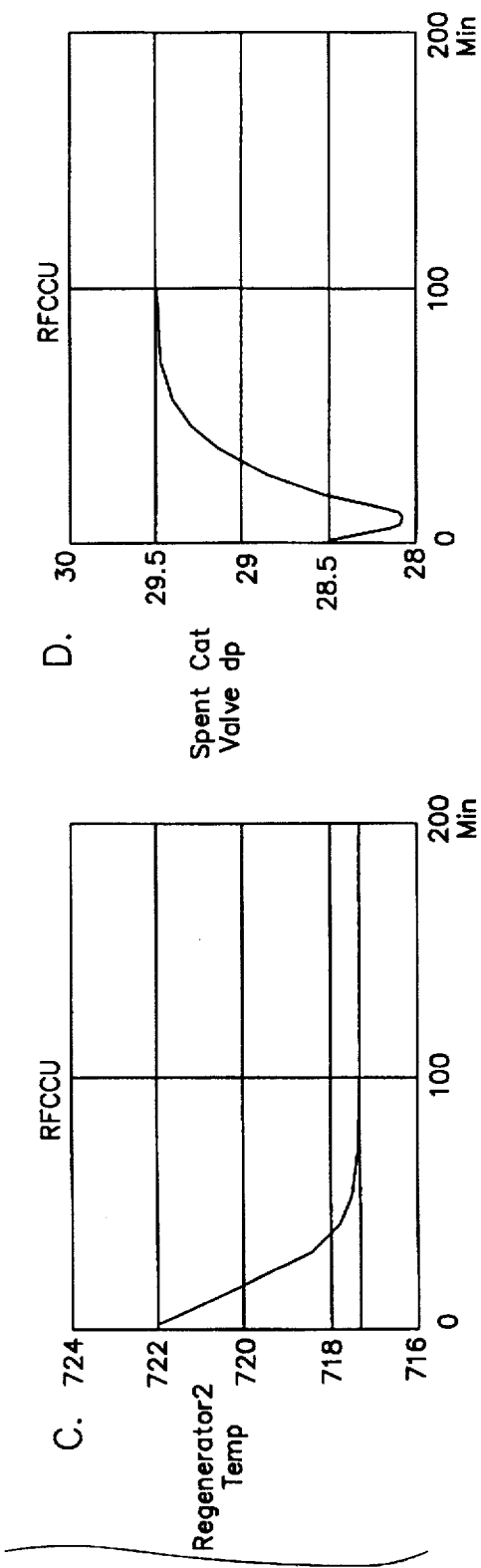
Figure 4:
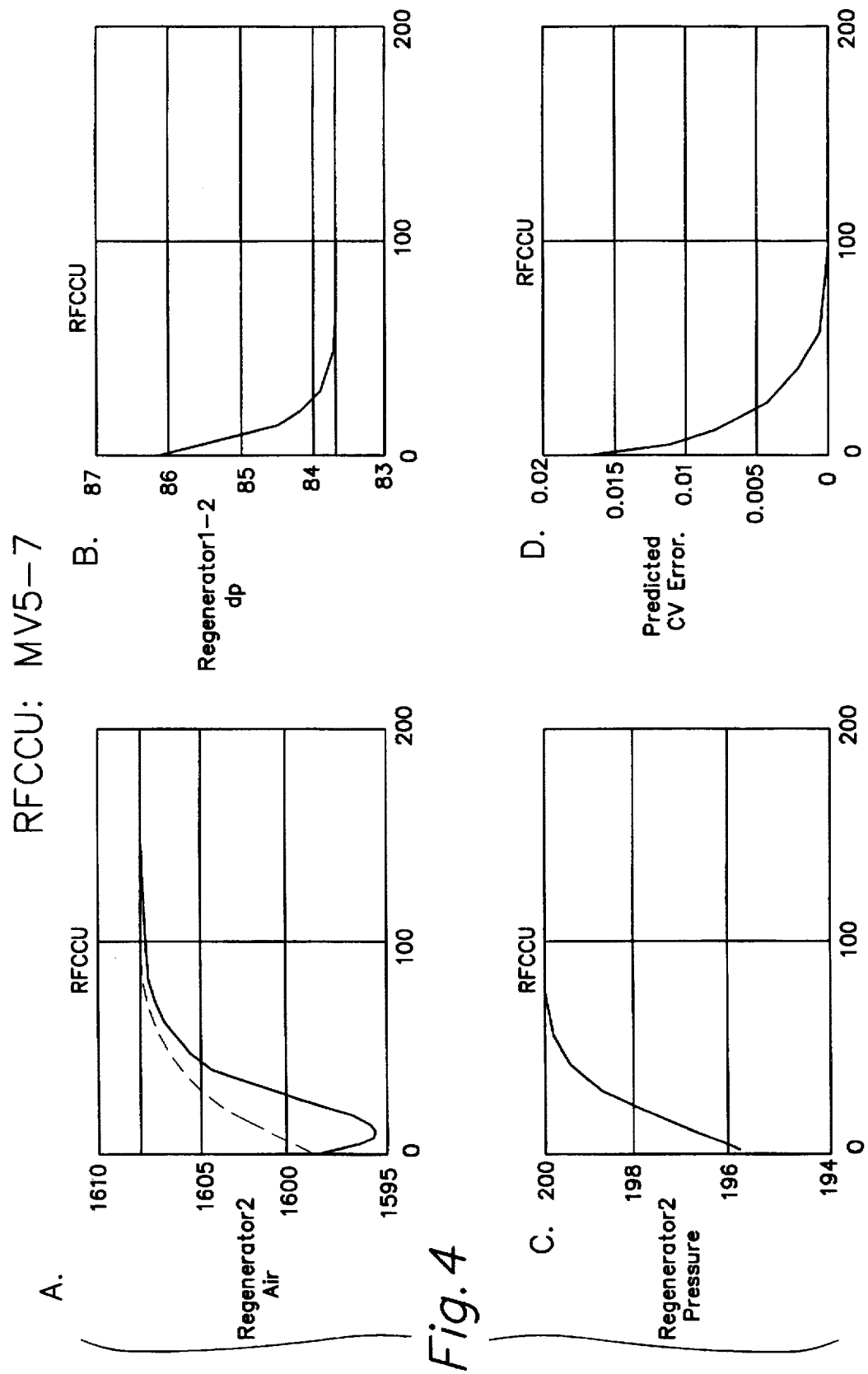
FIG. 4 shows the graphs of manipulated variables 5–7 of the example of FIG. 3 utilizing the method of the present invention.

Referring to FIG. 3, there is shown a graph the cv values for cv 1–4. Referring to FIG. 4, there is shown a graph of the mv 5–7 values. Note that the values of $mv_5$ (regenerator 2 air, FIG. 4A) shows the values decreasing before increasing toward the optimal value. This is to be compatible with

TABLE 1

| CCV # | CV Name |
|---|---|
| 1 | Regenerator2 Oxygen (%) |
| 2 | Regenerator1 Temp (c) |
| 3 | Regenerator2 Temp (c) |
| 4 | Spent Cat Valve dP |
| 6 | Plug Valve dP |
| 7 | Spent Cat Valve OP |
| 8 | Reg2 Flue Gas Valve OP |
| 9 | Regenerated Cat Valve OP |
| 10 | Wet Gas Compressor Amps |
| 11 | Product: C2 & Lighter |
| 12 | Product: C5–C8, FRCCS |
| 13 | Product: Decane Oil |
| 14 | Product: C3 & C3 = |
| 15 | Product: C4 & C4 = |
| 16 | Product: Light Gas Oil |
| 17 | CO Boiler Steam |
| 18 | Wet Gas Compressor OP |
| 19 | Blower Winding Temp (c) |
| 20 | Main Fractionator dP |

TABLE 2

| MV # | MV Name |
|---|---|
| 1 | Feed |
| 2 | Riser Temperature |
| 3 | Feed Temperature |
| 4 | Regenerator1 Air |
| 5 | Regenerator2 Air |
| 6 | Regenerator1–2 dP |
| 7 | Regenerator2 Pressure | the cv values and the other mv values. Had the optimization solution been cascaded, the dotted line curve would have been utilized, but is not compatible with $cv_1$ (regenerator 2 oxygen, FIG. 3A). Had the path of the dotted line been taken, the error in $cv_1$ would be larger, there would be more oxygen, making control of the burning speed more difficult, and too much oxygen makes the mixture more explosive.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

What is claimed is:

1. In a process control system, having a controller for providing robust control of a process, the controller utilizing a predetermined range control procedure, the results being a control solution, further the process having at least one manipulated variable and at least one controlled variable, a method of providing dynamic optimization comprising the steps of:

a) calculating an optimized set of steady state values of the manipulated variables and the controlled variables.

b) creating an augmented range control procedure to harmonize the set of steady state values with the control solution;

c) solving the augmented range control procedure, the manipulated variables generated thereby being compatible with the set of steady state values and with the control solution; and d) controlling the process in accordance with the manipulated variables generated by the augmented range control procedure, thereby providing optimal control of the process.

2. In a process control system, the method of claim 1 wherein the step of calculating comprises the step of calculating an optimized set of steady state variables of the manipulated variables and the controlled variables utilizing a quadratic steady state optimization expression.

3. In a process control system, the method of claim 1 wherein the step of solving includes dynamic input parameters of the process control system, the dynamic input parameters including setpoints, hi/lo limits, and system disturbances whereby the step of solving provides optimal manipulated variables resolved by the augmented range control procedure that are compatible with the set of steady state values and with the control solution.

4. In a process control system, the method of claim 1 wherein the step of solving further includes a selectable weighting matrix selected such that neither the optimized set of steady state values nor the control solution is predominant in the manipulated variables generated by the augmented range control procedure.

* * * * *